United States Patent [19]

Fung et al.

[11] Patent Number: 5,353,170
[45] Date of Patent: Oct. 4, 1994

[54] ERROR RECOVERY DATA STORAGE SYSTEM AND METHOD WITH TWO POSITION READ VERIFICATION

[75] Inventors: Kwok W. Fung, Santa Clara; Robert L. Kwok, San Jose; Arvind M. Patel, San Jose; Robert A. Rutledge, San Jose, all of Calif.

[73] Assignee: International Business Machines Corporation, Armonk, N.Y.

[21] Appl. No.: 64,297

[22] Filed: May 19, 1993

[51] Int. Cl.$^5$ .................... G11B 5/09; G11B 5/584
[52] U.S. Cl. .................... 360/53; 360/77.13
[58] Field of Search .................... 360/53, 66, 121, 15, 360/77.12, 77.02, 77.04, 77.06, 40, 77.13, 77.14; 29/603; 371/10.1, 49; 341/81; 340/172.5

[56] References Cited

U.S. PATENT DOCUMENTS

| | | | |
|---|---|---|---|
| Re. 31,166 | 3/1983 | Korda | 360/53 |
| 3,810,111 | 5/1974 | Patel | 360/40 X |
| 3,869,721 | 3/1975 | Korda | 360/53 |
| 3,876,978 | 4/1975 | Bosson et al. | 360/53 X |
| 4,485,418 | 11/1984 | Bremmer | 360/77.06 |
| 4,644,421 | 2/1987 | Miwa et al. | 360/66 |
| 4,771,346 | 9/1988 | Shoji et al. | 360/15 |
| 4,786,890 | 11/1988 | Marcus et al. | 360/40 X |
| 4,837,767 | 6/1989 | Hartwell et al. | 360/53 X |
| 4,858,048 | 8/1989 | Hayakawa et al. | 360/121 |
| 4,907,226 | 3/1990 | Endo | 360/53 X |
| 5,228,184 | 7/1993 | Kishi | 29/603 |

FOREIGN PATENT DOCUMENTS

| | | |
|---|---|---|
| 0220382 | 11/1986 | European Pat. Off. |
| 2654577 | 6/1978 | Fed. Rep. of Germany |
| 3157805 | 7/1991 | Japan |

OTHER PUBLICATIONS

IBM TDB, vol. 28, No. 1, Jun. 1985, pp. 203–204.
IBM TDB, vol. 32, No. 10B, Mar. 1990, pp. 90–92.
IBM TDB, vol. 29, No. 2, Jul. 1986, pp. 586–588.
IBM TDB, vol. 35, No. 4B, Sep. 1992, pp. 303–304.

*Primary Examiner*—Donald Hajec
*Assistant Examiner*—Patrick Wamsley
*Attorney, Agent, or Firm*—Douglas R. Millett

[57] ABSTRACT

A direct access storage device (DASD) system uses a read/write head having a wide transducer write element and a narrow magneto-resistive read element. In order to avoid mistakenly reading a incompletely erased old data field, the system uses a verification procedure. Data are read at two positions along the data track which are separated by a radial distance D. This distance D is selected to be greater than the width of any incompletely erased data record. If the data read at the two read positions are equal, then the data are deemed to be correct and are sent to a host system.

32 Claims, 6 Drawing Sheets

ERROR RECOVERY DATA STORAGE SYSTEM AND METHOD WITH TWO POSITION READ VERIFICATION

BACKGROUND OF THE INVENTION

1. Field of the Invention

This invention relates generally to data storage systems and more particularly to such systems having a wide write element and a narrow read element.

2. Description of the Prior Art

Direct access storage devices (DASD) or disk drives, store information on concentric tracks of a rotatable magnetic recording disk. A read/write head is moved from track to track in order to read and record the desired information. Typically, the head is positioned on an air bearing slider which flies above the surface of the disk as the disk rotates. In some proposed disk drives, the slider rides on a liquid film or bearing on the disk. A head suspension assembly connects the slider to a rotary or linear actuator which moves the head to different radial positions along the disk.

During operation of the DASD units, it is important that the head stay positioned over the center of the track on which it is writing or reading data. This has become increasingly difficult as the tracks have become smaller in width and are spaced closer together in order to increase the overall data density of the DASD. The head may be off center due to differences in thermal expansion of the different parts of the DASD, in accuracies in the head position actuator, imperfect axial rotation of the spindle motor which rotates the disk, or any of a number of other factors.

One solution to the head mispositioning problem is to move the head in incremental steps across the track and try to determine the actual center of the track. The references which discuss this include U.S. Pat. No. 4,485,418 issued Nov. 27, 1984; European Patent Application 0220382 published Jun. 5, 1987; IBM Technical Disclosure Bulletin, Vol. 35, No. 4B, p. 303, September 1992; IBM Technical Disclosure Bulletin, Vol. 29, No. 2, p. 586, July 1986.

Incomplete erasure of a previously recorded data track is another problem which occurs due to mispositioning of the head. When a new data field is written on a track, it overwrites the previous old data field. However, if the head is not properly centered on the track, then a slice of the old data may remain at the edge of the new data field. This may cause errors in reading.

One approach to solving this problem has been to provide erase bands between the data tracks. The head may have additional separate erase elements on either side of the write element in order to insure that the edge of each newly written field does not contain any data. Alternatively, the write element may be used to create the erase bands on either side of a newly written data field. Examples of this include U.S. Pat. No. 4,858,048 issued Aug. 15, 1989; U.S. Pat. No. 4,771,346 issued Sep. 13, 1988; U.S. Pat. No. 4,644,421 issued Feb. 17, 1987; Japanese application 03-157805 published Jul. 5, 1991; German patent application DE2654577 published Jun. 8, 1978; IBM Technical Disclosure Bulletin, Vol. 32, No. 10B, p. 90, March 1990; IBM Technical Disclosure Bulletin, Vol. 28, No. 1, p. 203, June 1985.

Magneto-resistive heads have recently been used in DASD devices. These heads contain separate write and read elements. The wide write element is a transducer element which is optimized for writing. The narrower read element is a magneto-resistive element which is optimized for reading. The magneto-resistive head allows smaller and more closely spaced data tracks to be written and read, thereby increasing the overall capacity of the DASD.

The inventors have discovered that because the magneto-resistive read element is much narrower than the write element, there is a good chance that a previously written field which has not been completely erased may be mistakenly read. The probability of reading an old data field is further increased by the need to hunt across the track width in some circumstances in order to successfully read a data field. This hunting only increases the chance than an old unerased data field at the edge of the track may be mistakenly read. The addition of erase bands on either side of the data track is not practical due to the close spacing of the tracks. The edge of a data track cannot be erased without also erasing a portion of a neighboring data track.

What is needed is a DASD system and method which does not need erase bands and which will not mistakenly read incompletely erased previously data fields.

SUMMARY OF THE INVENTION

In accordance with a preferred embodiment of the present invention, a data storage system comprises a rotatable magnetic disk having data tracks of width W, a magneto-resistive head attached to an actuator located over the data tracks, a control unit connected to the head and actuator. If a data field is read with the head positioned within a certain small spacing of the center of the data track, the data are deemed to be correct and are sent to the host system. If the data cannot be read within this narrow ban at the track center, the head is moved in incremental steps (both positive and negative) across the track. Once the data are successfully read, the head is moved a distance D across the track and the field is again read. If the data read at the two locations are equal, then the data are deemed to be correct and are sent to the host system. The distance D is selected to be larger than the width of any previously unerased old data. This ensures that the old data are never read by mistake. In the preferred embodiment $W/4 \leq D \leq W/2$ and D is optimally equal to approximately $W/3$.

For a fuller understanding of the nature and advantages of the present invention, reference should be made to the following detailed description taken in conjunction with the accompanying drawings.

DESCRIPTION OF THE PREFERRED EMBODIMENTS

Figure 1:
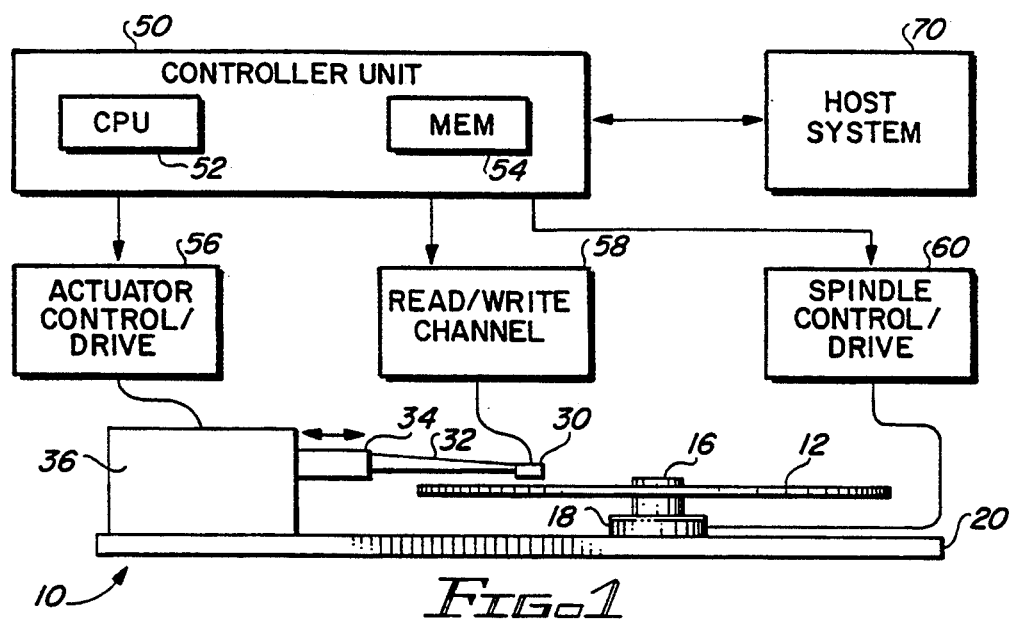
FIG. 1 is a schematic diagram of a data storage system of the present invention.
Figure 2:
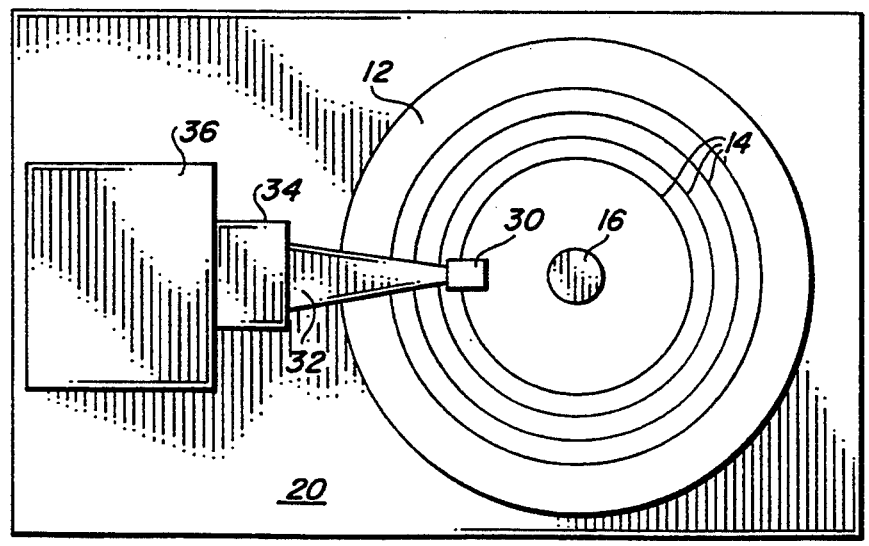
FIG. 2 is a top view of a portion of the system of FIG. 1.

FIGS. 1 and 2 show schematic diagrams of a data storage system of the present invention which is designated by the general reference number 10. System 10 comprises a magnetic recording disk 12 which has a magnetic recording layer and which has a plurality of concentric data tracks 14. Disk 12 is attached to a spindle 16. Spindle 16 is connected to a spindle motor 18 which is mounted to a chassis 20.

A read/write head 30 is positioned over disk 12. Head 30 is attached to a suspension 32 which in turn is attached to an arm 34. Arm 34 is connected to a linear actuator 36 which moves had 30 to different radial positions over disk 12. Actuator 36 may be a voice coil motor or alternatively, the actuator 36 may be a rotary actuator. Actuator 36 is also mounted to chassis 20.

A controller unit 50 provides overall control to system 10. Controller unit 50 typically contains a central processing unit (CPU) 52 and a memory (MEM) 54 along with other digital circuitry as is known in the art. Memory 54 may be comprised of dynamic random access memory (DRAM) or read only memory (ROM) integrated circuits. Controller 50 is connected to an actuator control/drive unit 56 which in turn is connected to actuator 36. This allows controller 50 to control the movement of head 30 over disk 12. The controller 50 is connected to a read/write channel which in turn is connected to the head 30. This allows controller 50 to send and receive data from the disk 12. Controller 50 is connected to a spindle control/drive unit 60 which in turn is connected to spindle motor 18. This allows controller 50 to control the rotation of disk 12. A host system 70, which is typically a computer system, is connected to the controller unit 50. System 70 may send digital data to controller 50 to be stored on disk 12, or may request that digital data be read from the disk and sent to the system 70. The basic operation of DASD units is well known in the art and is described in more detail in *Magnetic Recording Handbook*, C. Dennis Mee and Eric D. Daniel, McGraw & Hill Book Company, 1990.

Figure 3:
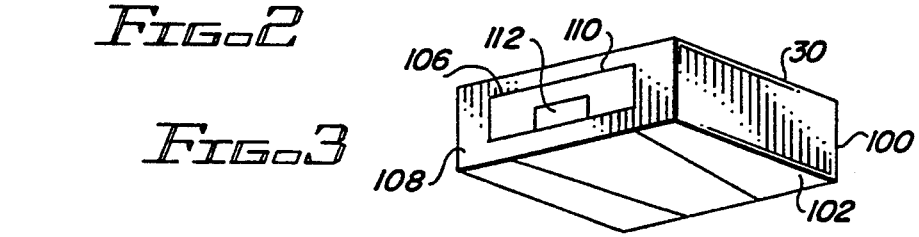
FIG. 3 is a schematic diagram of a magneto-resistive head of the present invention.

FIG. 3 shows a schematic diagram of head 30 of FIG. 1. Head 30 comprises a slider element 100. Slider element 100 has an air bearing surface 102 which faces the surface of disk 12. The surface 102 is designed to create an air bearing between itself and the rotating disk 12 to allow the slider 100 to fly above the surface of the disk 12. A read/write element 106 is attached to a side surface of slider 100. The element 106 comprises an inductive write element 110 and a magneto-resistive read element 112. The write element 110 is much wider than the read element 112. The write element 110 and the read element 112 are connected to the read/write channel 58. The read/write element 106 may be similar to that described in U.S. Pat. No. 3,908,194 assigned to International Business Machines Corporation. The width (W) of the data tracks 14 is approximately equal to the width of the write element 110 and is approximately equal to 300 microinches (7.62 micrometers) in a preferred embodiment.

Figure 4:
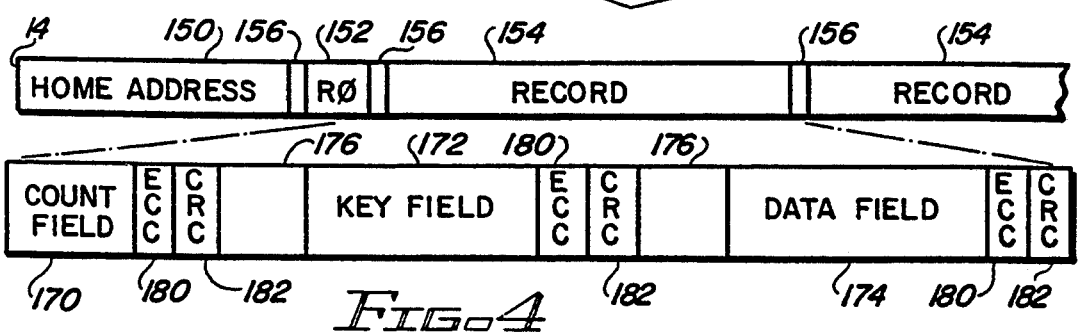
FIG. 4 is a schematic diagram of a data track of the system of FIG. 1.

FIG. 4 shows a schematic diagram of a data track 14 of disk 12. Track 14 comprises blocks of magnetically recorded data. The blocks include a home address 150, a record zero block 152, and a plurality of record blocks 154. Each block is separated by a gap 156. The home address 150 contains information on each track and the record zero block 152 contains information on the number and length of the records that follow.

Each record block 154 is comprised of a count field 170, an optional key field 712 and a data field 174. The count field 170 contains data which identify the particular record and the lengths of the fields, the key field 172 contains data on the type of information contained in the following data field, and the data field 174 contains the actual data which are to be stored. All of these field are separated by gaps 176. Each field also contains an error correction code (ECC) 180 and a cyclical redundancy check (CRC) code 182. The codes are used by the controller unit 50 to detect errors in the preceding data in the field and provide error correction. A more detailed description of such coding is given in *Magnetic Recording Handbook*, supra, Part, 2, Chapter 8, page 1182.

Figure 5:
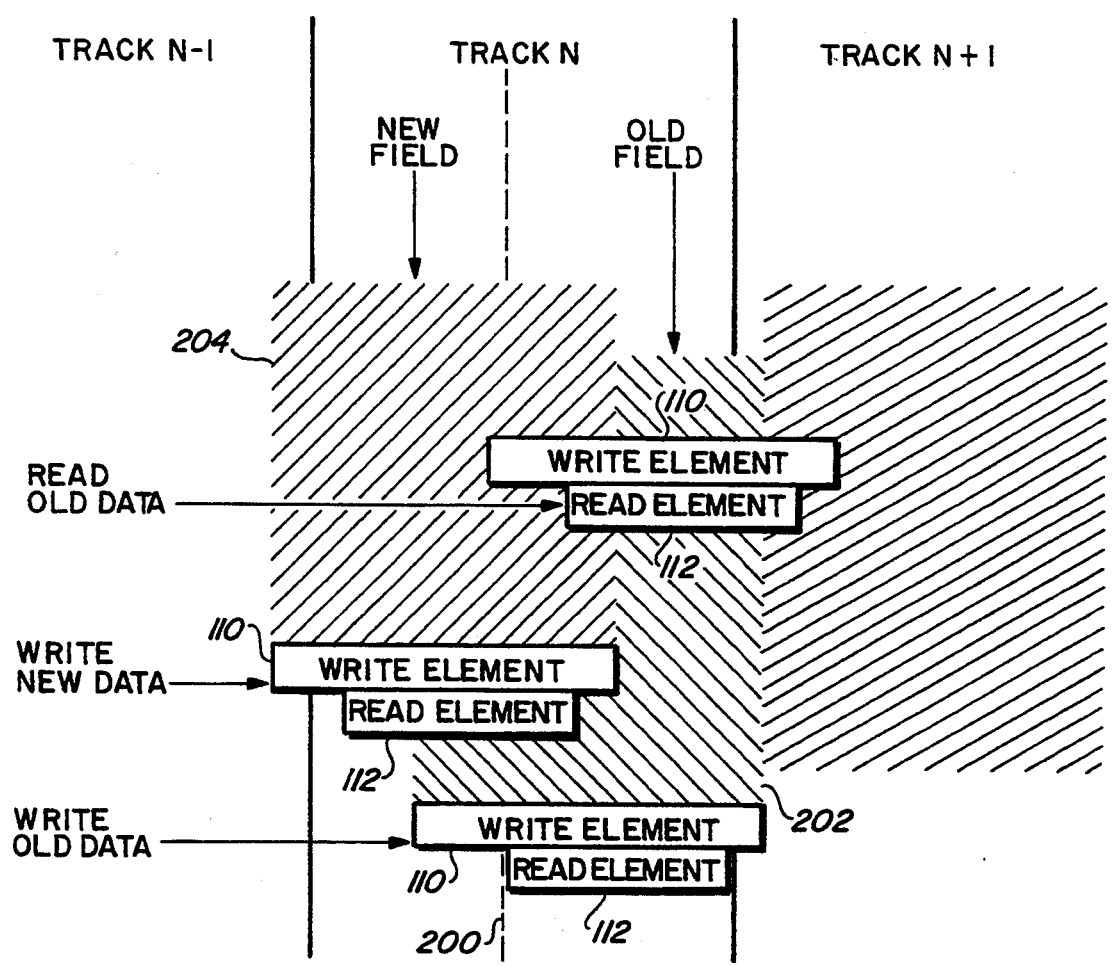
FIG. 5 is a schematic diagram of three adjoining data tracks of the present invention and illustrates the reading and writing of a track.

FIG. 5 shows a schematic diagram of three adjoining data tracks of the system 10 and illustrates the problem of reading old data by mistake. A center track N is located between tracks N−1 and N+1. A dotted line 200 represents the ideal center of track N. First, an old data field 202 is written on track N. The controller 50 sends the digital data signal to the read/write channel 58 which converts it to an analog signal which drives the write element 110. The write element 110 generates magnetic fields which record the data as field 202 on the magnetic disk 12. Due to mispositioning of the head, the field 202 is written slightly to the right of the track center line 200. Next, the old data field is to be replaced with a new data field 204. Field 204 is written on track N. However, this time the head is offset to the left of the center line 200. This leaves a significant edge of the old data field 202 unerased at the edge of the new data field 204. Due to the narrow width of the read element 112, there is a possibility that this old field 202 may be read and mistaken for the new field 204. This would result in faulty data being sent to the host system 70. The present invention solves this problem by verifying that the data read are not from the old field. This is described in more detail below.

FIGS. 6–11 are flowchart diagrams which illustrate the operation and method of system 10 of the present invention and are designated by the general reference number 300. This method is implemented as stored digital data in the control unit 50 in the preferred embodiment. Alternatively, the method could be implemented as discrete electronic circuits. At a stop 302, system 10 reads a field of a data track of disk 12 with the head 30 positioned at offset zero. In other words, the controller unit 50 moves the head 30 to a position where the controller 50 estimates that the center of the desired track is located. This offset zero position may or may not be the actual rack center 200. The read element 112 senses the magnetically recorded data on the data track 14 and sends an analog signal to the read/write channel 58. The read/write channel 58 converts the analog signal to a digital signal which is then received by the controller 50.

At a step 304, it is determined whether or not the read was successful. This is determined by the controller 50 by checking the ECC and CRC codes of the field by methods which are well known in the art. If the read was successful, than at a step 306 the data which were read from the disk are sent to the host system 70.

If a successful read is not achieved, then the field is reread with the head 30 positioned at offset zero at a step 308 and is checked for a successful read at a step 310. If the read is successful, then the data are sent at a step 306. If the read is not successful, then the length of the record is checked at a step 312. The controller 50 has stored data on the length of the count fields which are all the same length. Once a count field is read, the controller 50 will have information on the lengths of the following key and data fields. If the particular field length of the field which is to be read is less than or equal to L1 bytes, the field in a short field, then at a step 314 L1 values are set. If the field length is greater than L1, then the operation goes to a step 316. At step 316 it is determined if the field length is greater than or equal to L3 bytes. If so, the field is a long field and the operation goes to a step 318, where L3 values are set and, if not, the field is a medium field and the operation goes to a step 320 where L2 values are set.

The reason for checking the length is that if the record is very short, there is a possibility that the error correction code methods may be able to correct the data even though the data was read from an undesired unerased old record. For a very short field, a lower level of error correction will be used. Also, the distance D that the head moves across the track will vary depending on the field length. In a preferred embodiment L1 equals 2048 bytes and L3 equals 6468 bytes. The following table shows the values which will be set.

| Field Length | ECC Check | imax | S(1) | D(1) | S(2) | D(2) | S(3) | D(3) | DF |
|---|---|---|---|---|---|---|---|---|---|
| Short | Type 1 | 3 | 15 | — | 30 | 110 | 40 | 100 | 100 |
| Medium | Type 2 | 3 | 15 | — | 30 | 90 | 40 | 75 | 100 |
| Long | Type 2 | 3 | 15 | — | 30 | — | 40 | — | — |

The ECC type varies depending upon the record length. For short records a lower level type 1 EC is used. For long records a higher level type 2 ECC is used. These high and low level ECC are described in U.S. Pat. No. 4,706,250 issued Nov. 10, 1987 to A. M. Patel. The imax value is an integer value which gives the maximum number of steps in a positive or negative direction in which the head will be moved across the track. The D(1), D(2), D(3) and DF values are given in microinches (the equivalent micrometer values may be obtained by dividing the microinch values by 39.4) and represent the distance apart at which two successful reads must be made in order to confirm the data. The values S(1), S(2), S(3), give the microinch distances (the equivalent micrometer values may be obtained by dividing the microinch values by 39.4) that the head will be moved away from the zero offset value. The use of these values will become more apparent from the description below.

At a step 322 the value i is set to one. The value i represents the number of offset steps which the head is moved away from offset zero. At a step 324, the head 30 is moved to offset S(i) or S(1) in this first case. This is the distance value at which the head 30 is moved in a positive direction away from offset zero and this distance is obtained from the above table. The field is read at a step 326 and at a step 328 it is determined if the read was successful. If the read was successful, then the data are sent at a step 330. If not, at a step 332 the head is moved to offset value negative S(i) or negative S(1) in this first case. This distance value is the same S(1) except it is in the negative direction away from offset zero. The field is read at a step 334 and is checked at a step 336. If the read is successful, then the data are sent at a step 330 and if not, then the operation moves to step A of FIG. 7.

Figure 6:
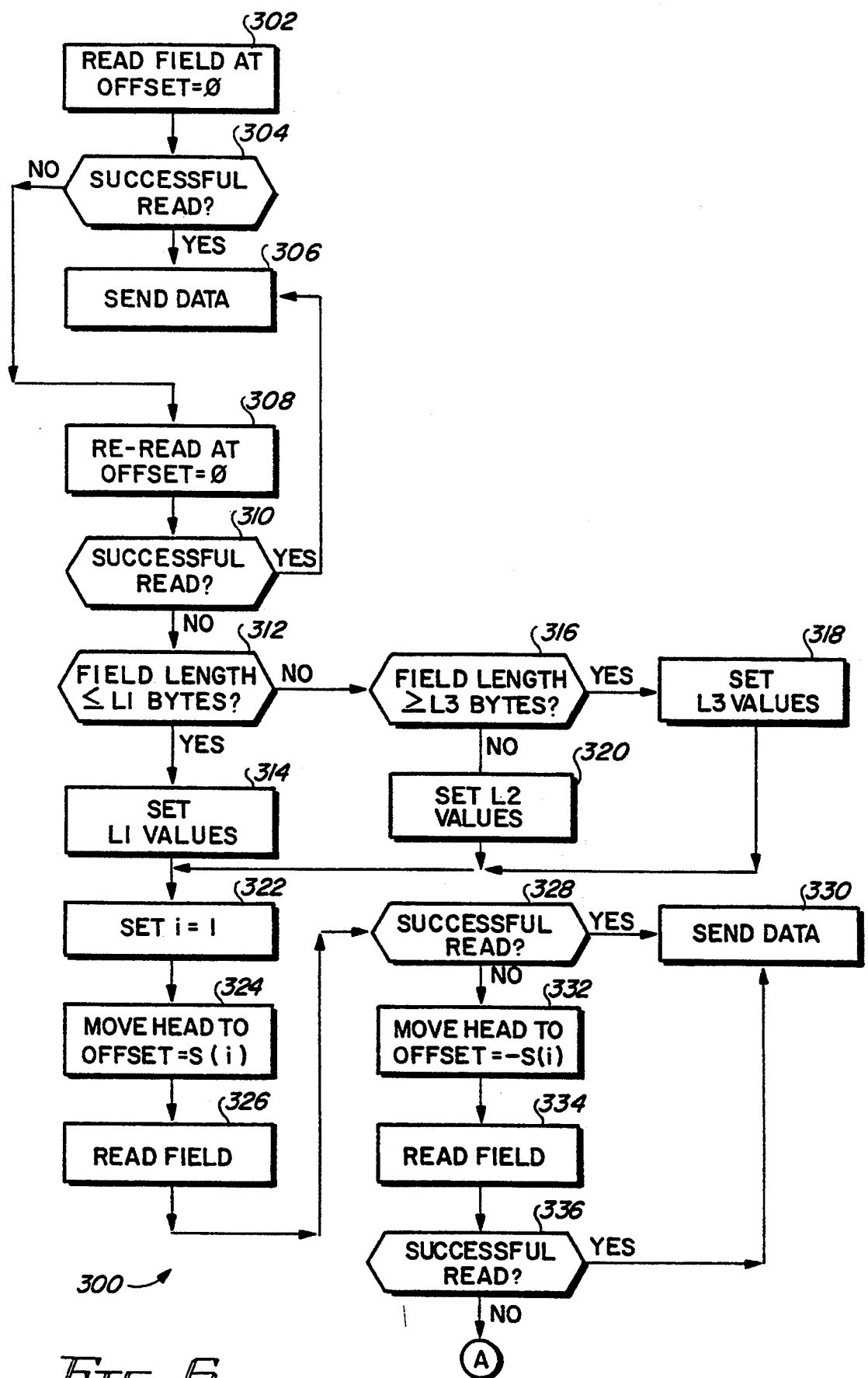
FIGS. 6, 7, 8, 9, 10, and 11 are flow chart diagrams which illustrate the operation of the system of the present invention.

The overall operation of the steps in FIG. 6 may now be summarized. The field was not able to be read at offset zero, the center of the track. If the record can be rad at a single small step S(1) on either side of offset zero, then the data are deemed to be correct and are sent out even though there was only one successful read. However, if the field must be read at a distance greater than S(1) distance away from offset zero, then an additional confirming read at a different head position is needed.

Figure 7:
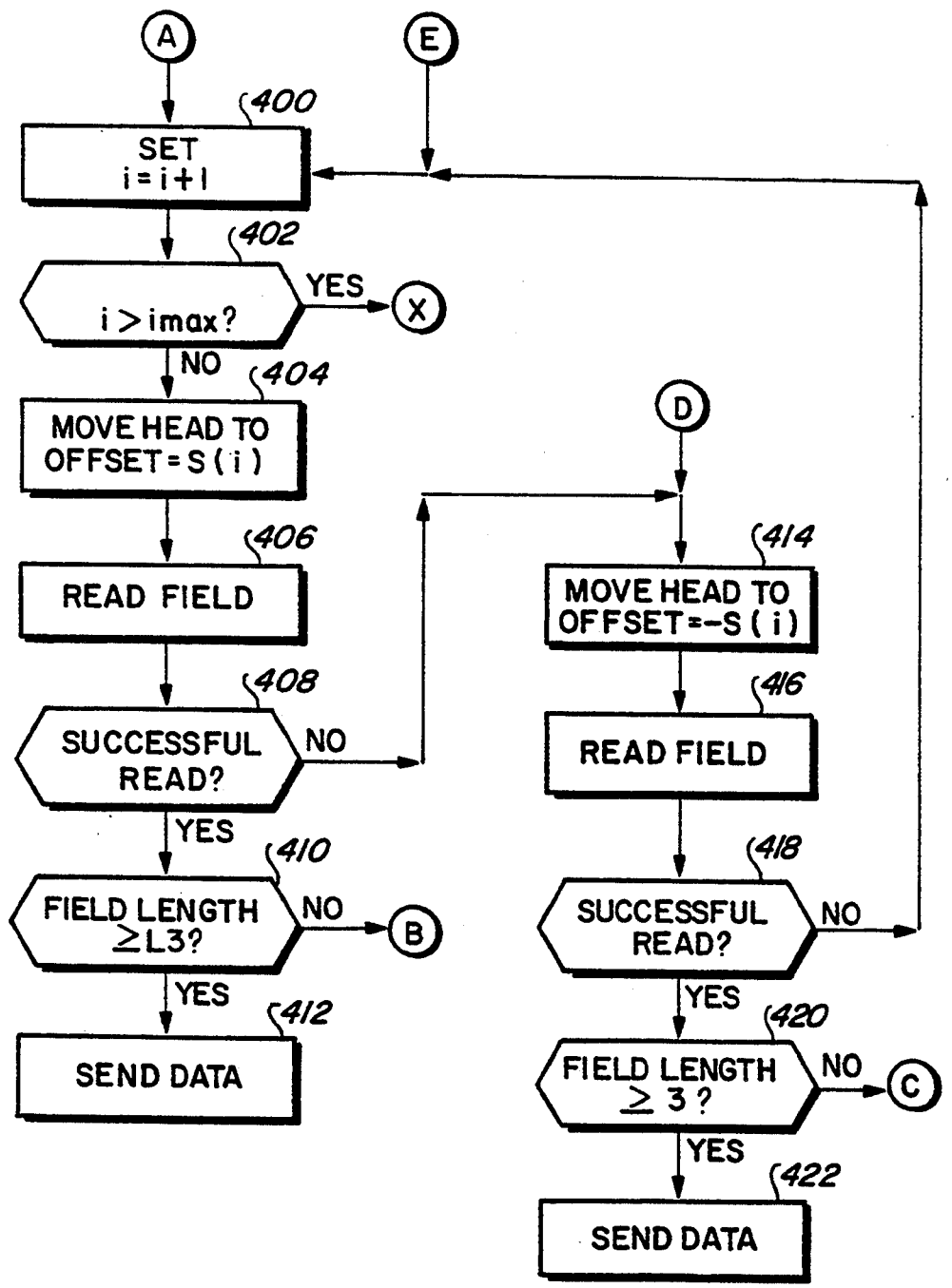

In FIG. 7 step A leads to a step 400. At step 400, i is incremented by one. At a step 402, i is compared to imax. If i is greater than imax, then the maximum number of offset steps have already been taken and the operation moves to step X of FIG. 10. If i is less than or equal to imax, then at a step 404 the head 30 is moved to offset to S(i). At a step 406 and a step 408, the field is read and checked respectfully. If the read was successful, than at a step 410 the field length is checked. If the field length is greater than or equal to L3, then the operation goes to a step 412 and the data are sent. If the field length is less than L3, then the next step B of FIG. 8. If the read at step 408 was not successful, then the head 30 is moved to negative S(i) at a step 414. The field is read and checked at step 416 and a step 418, respectfully. If the read is not successful, then the operation returns to step 400. If the read is successful, then at a step 420 the length of the field is checked. If the field length is greater than or equal to L3, then the data are sent at a step 422. If the field length is less than L3, then the next step is C of FIG. 9.

The overall operation of FIG. 7 may now be summarized. The head 30 is alternatively moved the same positive and negative distance away from the zero offset across the track in order to try and read the record. The step distance is progressively increased. If a successful read is achieved at a positive offset position and the field length is less than L3, the operation goes to step B for a confirming read. If a successful read is achieved at a negative offset position and the field length is less than L3, the operation goes to step C for a confirming read. If the field length is greater than or equal to L3, and a successful read has been made, then the chance that the data read are from an incompletely erased old record is very small and the data are deemed to be correct.

Alternatively, fields greater or equal to L3 may also have a confirming read. In this case steps 410, 412, 420 and 422 may be eliminated and steps 408 and 418, would lead directly to steps B and C, respectively, if a successful read was made. Appropriate values for D (such as 100 microinches (2.54 micrometers) for L3 could be added to the table above.

Figure 8:
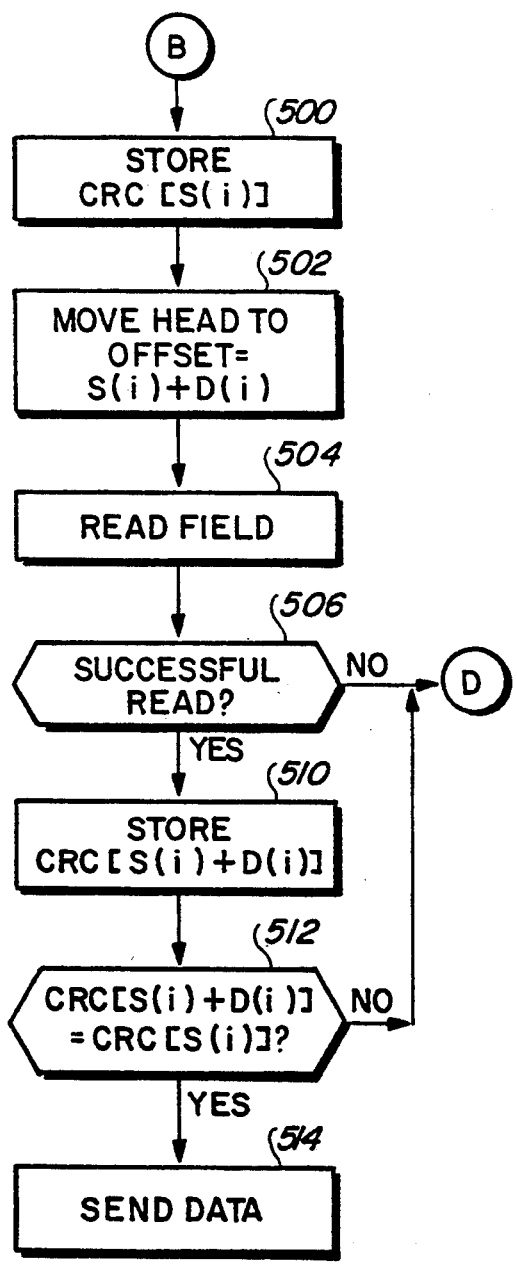

FIG. 8 shows that step B leads to a step 500. At step 500, the CRC value of the record which has just been read at offset S(i) is stored as a value CRC[S(i)]. At a step 502 the head 30 is moved to offset S(i)+D(i). D(i) is a distance selected to be greater than that of the width any unerased previous old record. In a preferred embodiment, $W/4 \leq D(i) \leq W/2$ and D is optimally equal to approximately W/3, where W is equal to the width of the track. At a step 504 and a step 506 the field is read and checked, respectively. If the field was not read successfully, then the operation goes to a step D of FIG. 7. If the record is successfully read, then at a step 510 the CRC value of the record read at $S(i)+D(i)$ is stored as a value $CRC[S(i)+D(i)]$. At a step 512 the $CRC[S(i)+D(i)]$ value is compared to the $CRC[S(i)]$ value. If the values are equal, then it is determined that this is a new record, not an old unerased record, and the data are sent at a step 514.

Figure 9:
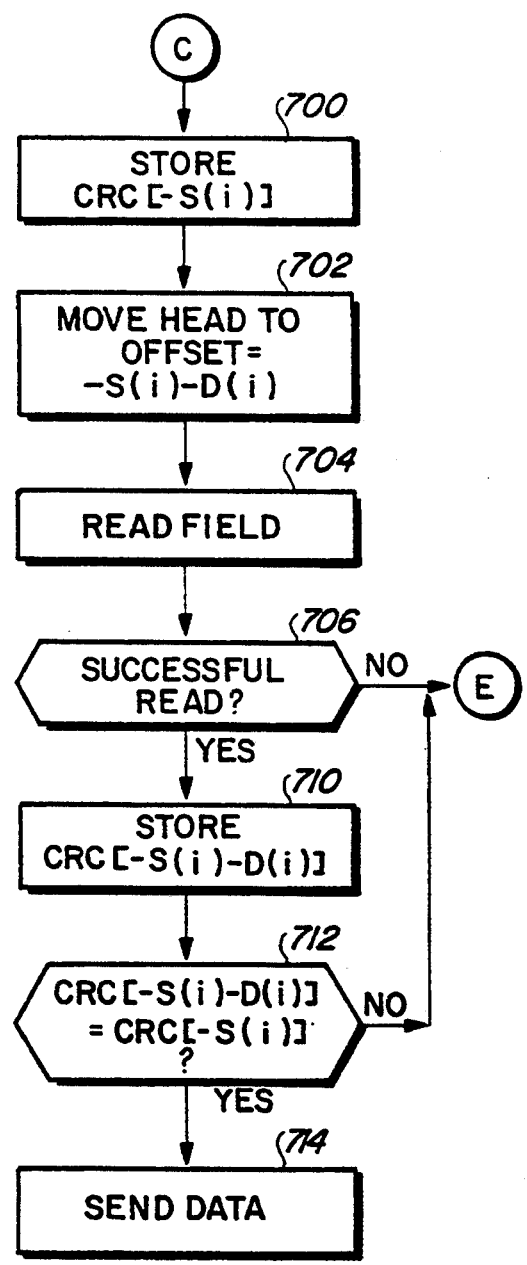

FIG. 9 shows step C leads to a step 700. At step 700, the CRC value of the record which has just been read at offset $-S(i)$ is stored as a value $CRC[-S(i)]$. At a step 702 the lead 30 is moved to offset $-S(i)-D(i)$. At a step 704 and a step 706 the field is read and checked, respectively. If the field was not read successfully read, the operation goes to a step E of FIG. 7. If the field is successfully read, then at a step 710 the CRC value of the record read at $-S(i)-D(i)$ is stored as value $CRC[-S(i)-D(i)]$. At step 712 the value $CRC[-S(i)-D(i)]$ is compared to the value $CRC[-S(i)]$. If the values are equal, then it is determined that this is a new record and is not an old unerased record and the data are sent at a step 714.

The operation illustrated in FIGS. 8 and 9 may now be understood. If a first successful read is achieved a certain distance $S(i)$ beyond the center of a track, then there must be a second verifying read of the same data at least a distance $D(i)$ away from the first read.

Figure 10:
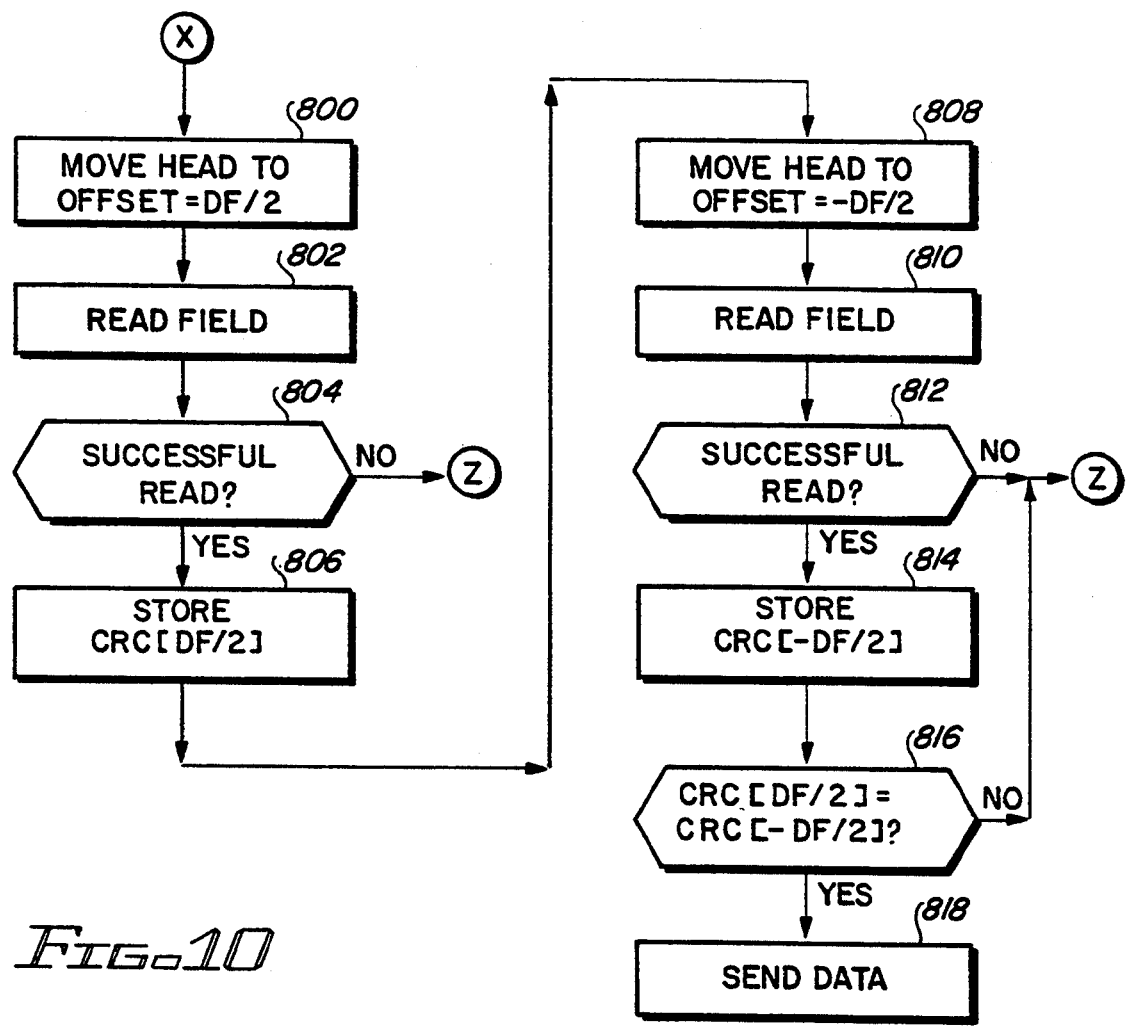

In FIG. 10, step X leads to a step 800. The head 30 is moved to offset DF/2. The field is read and checked at a step 802 and a step 804, respectively. If the record is not read successfully, then the operation goes to step Z of FIG. 11. If the read is successful, then the CRC value is stored as value CRC[DF/2] at a step 806. At a step 808 the head 30 is moved to offset $-DF/2$. At a step 810 and a step 812, the field is read and checked, respectively. If the field is not read successfully, then the operation goes to step Z of FIG. 11. If the field is successfully read, then the CRC value is stored as value $CRC[-DF/2]$ at a step 814. At a step 816, the value CRC[DF/2] is compared to the value $CRC[-DF/2]$. If the values are equal then the data are sent at a step 818, and if not, the operation goes to step Z.

The operation illustrated in FIG. 10 may now be understood. If the maximum number of steps has been taken (i>imax), then the operation starting at step X is used. An attempt is made to successfully read the field at two positions which are located a distance DF (D Final) apart. This is done by moving the head first to a position positive DF/2 and then to a position negative DF/2 from the zero offset position. If the confirming read cannot be made, then the operation goes to step Z of FIG. 11.

Figure 11:
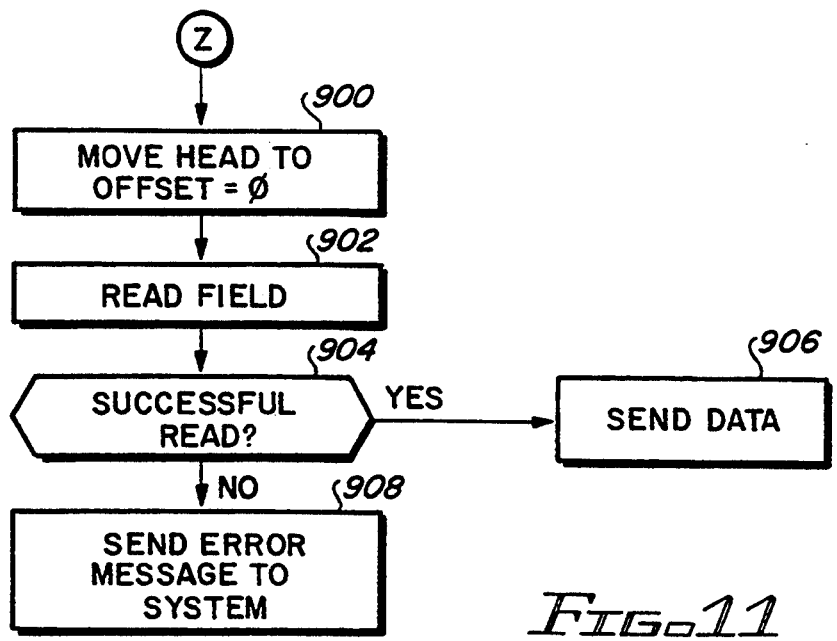

FIG. 11 shows step Z leading to a step 900 at which the head 30 is moved back to the offset zero position. At a step 902 and a step 904 the field is read an checked respectively. If there is a successful read, then the data are sent at a step 906. If not, then an error message is sent to the host system at a step 908. These last steps of FIG. 11 are implemented when no successful read and verification of the record has been achieved and the system 70 must be notified that the desired record cannot be accessed.

In summary, the present invention teaches a storage system which verifies that the data is correct by comparing the data read at two positions a distance D apart. In a preferred embodiment, this is done by comparing the CRC values of both data reads. However, the invention could also be practiced by comparing other portions of the fields, such as the error correction code. Alternatively, the fields may be compared in their entirety.

Other embodiments of the present invention are possible. For example, instead of starting at offset zero, the head could be positioned at an outer position initially and the moved incrementally closer to the zero offset, alternating from side to side. Also, the exact value of D may be adjusted depending upon the disk size or radial position of the desired track. Additional re-read steps may also be added so that a read is attempted multiple times at each head position.

Although the present invention uses a variable data field length, the invention can also be applied to fixed block systems. These systems are known in the art and have data fields which are sectored or fixed in length. In such a case, the determination of the data field length may not be necessary.

While the preferred embodiments of the present invention have been illustrated in detail, it should be apparent that modification and adaptations to those embodiments may occur to one skilled in the art without departing from the scope of the present invention as set forth in the following claims.

What is claimed is:

1. A data storage system comprising:
   a data storage medium having data tracks;
   a read element;
   a read means connected to the read element for causing the read element to read data from a data track;
   a movement means for moving the medium relative to the read element;
   a positioning means for moving the read element relative to the data storage medium to different positions across the width of the data tracks; and
   a control means connected to the positioning means for controlling the movement of the read element such that two successful reads are made a distance D apart on the same track, the control means further including a comparison means for comparing the data read from the two reads to determine if they are the same.

2. The system of claim 1, wherein $W/4 \leq D \leq W2$, where W is the width of the data track.

3. The system of claim 1, wherein D is substantially equal to W/3, where W is the width of the data track.

4. The system of claim 1, wherein the data storage medium has a magnetic recording layer.

5. The system of claim 1, wherein the read element is a magneto-resistive element.

6. The system of claim 1, wherein the comparison means compares a selected portion of the data from the two successful reads.

7. The system of claim 1, wherein the comparison means compares the cyclical redundancy check code of the two successful reads.

8. The system of claim 1, further comprising a write element connected to the positioning means and having a width greater than the width of the read element.

9. The system of claim 1, wherein the distance D varies according to the length of the data to be read.

10. The system of claim 1, wherein the control means causes the read element to be moved in incremental distance away from an initial position in order to obtain a first successful read.

11. The system of claim 10, wherein the distance D varies according to the number of incremental distances which the head element has been moved.

12. A method for a data storage system comprising the steps of:
   moving a read head to a first position along the width of a data track of a data storage medium;
   reading the data track at the first position;
   determining if a successful data read has occurred at the first position;
   storing the information read at the first position;
   moving the read head to a second position along the width of the data track, the second position being a distance D from the first position;
   reading the data track at the second position;
   determining if a successful data read has occurred at the second position; and
   determining if the data of the first read are equal to the data of the second read and transmitting the data if they are equal.

13. The system of claim 12, wherein $W/4 \leq D \leq W/2$, where W is the width of the data track.

14. The system of claim 12, wherein D is substantially equal to W/3, where W is the width of the data track.

15. The system of claim 12, wherein the data storage medium has a magnetic recording layer.

16. The system of claim 12, wherein the read head is a magneto-resistive element.

17. The system of claim 12, wherein the step of determining if the data are equal is comprised of comparing a selected portion of the data from the two successful reads.

18. The system of claim 12, wherein the step of determining if the data are equal is comprised of comparing the cyclical redundancy check code of the two reads.

19. The system of claim 12, wherein the read element has a width less than the width of a data track.

20. The system of claim 12, wherein the distance D varies according to the length of the data to be read.

21. The system of claim 12, further comprising the step of moving the read head in incremental distances away from an initial position in order to obtain a first successful read.

22. The system of claim 21, wherein the distance D varies according to the number of incremental distances which the read had has been moved.

23. A data storage system comprising:
   a data storage medium having data tracks;
   a read element;
   a read means connected to the read element for causing the read element to read data from the data track;
   a movement means for moving the medium relative to the read element;
   a positioning means for moving the read element relative to the data track to different positions across the width of the data tracks; and
   a control means connected to the positioning means for causing the read element to be moved in alternating positive and negative incremental distances away from an initial position until a first successful read has been made of the data, and for causing the read element to be moved to a second position a positive distance D away from the position of the first successful read if the first successful read was made at a positive incremental distance and causing the read element to be moved to a second position a negative distance D away from the position of the first successful read if the first successful read was made at a negative incremental distance, such that a second successful read is made at the second position, the control means further including a comparison means for comparing the data read from the first position and the second position to determine if they are the same.

24. The system of claim 23, wherein $W/4 \leq D \leq W/2$, where W is the width of the data track.

25. The system of claim 23, wherein D is substantially equal to W/3, wherein W is the width of the data track.

26. The system of claim 23, wherein the data storage medium has a magnetic recording layer.

27. The system of claim 23, wherein the read element is magneto-resistive element.

28. The system of claim 23, wherein the comparison means compares a selected portion of the data read from the first and second positions.

29. The system of claim 23, wherein the comparison means compares the cyclical redundancy check code of the two successful reads.

30. The system of claim 23, wherein the distance D varies according to the length of the data to be read.

31. The system of claim 23, wherein the distance D varies according to the number of incremental distances which the read element has been moved.

32. The system of claim 23, further comprising a write element connected to the positioning means and having a width greater than the width of the read element.

* * * * *

UNITED STATES PATENT AND TRADEMARK OFFICE
CERTIFICATE OF CORRECTION

PATENT NO. : 5,353,170
DATED : Oct. 4, 1994
INVENTOR(S) : K. Fung, R. Kwok, A. Patel and R. Rutledge It is certified that error appears in the above-indentified patent and that said Letters Patent is hereby corrected as shown below:

Column 2, line 36 delete "ban" and add --band--
Column 3, line 15 delete "had" and add --head--
Column 4, line 5 delete "identify" and add --identifies--
Column 4, line 9 delete "field" and add --fields--
Column 5, line 36 delete "EC" and add --ECC--
Column 6, line 6 delete "rad" and add --read--
Column 8, line 48 delete "W2" and add W/2--

Signed and Sealed this

Eighteenth Day of July, 1995

Attest:

BRUCE LEHMAN

Attesting Officer

Commissioner of Patents and Trademarks